United States Patent
Fukumi

(10) Patent No.: US 7,577,521 B2
(45) Date of Patent: Aug. 18, 2009

(54) ITEM SEARCH DEVICE

(75) Inventor: Makoto Fukumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 812 days.

(21) Appl. No.: 11/178,315

(22) Filed: Jul. 12, 2005

(65) Prior Publication Data

US 2006/0047422 A1 Mar. 2, 2006

(30) Foreign Application Priority Data

Aug. 25, 2004 (JP) ............................. 2004-245649
Jun. 10, 2005 (JP) ............................. 2005-170558

(51) Int. Cl.
  *G01C 21/30* (2006.01)
(52) U.S. Cl. ..................... 701/209; 701/23; 701/25; 701/202; 340/995.19
(58) Field of Classification Search ............ 701/200, 701/23, 25, 202, 209, 211, 212; 340/990, 340/995.2, 995.19, 995.18
See application file for complete search history.

(56) References Cited

U.S. PATENT DOCUMENTS

2002/0165665 A1* 11/2002 Kim ........................... 701/209
2006/0089788 A1* 4/2006 Laverty ...................... 701/202

FOREIGN PATENT DOCUMENTS

| JP | A-2002-296057 | 10/2002 |
| JP | A-2004-109146 | 4/2004 |
| JP | A-2004-157125 | 6/2004 |

* cited by examiner

*Primary Examiner*—Gertrude Arthur Jeanglaud
(74) *Attorney, Agent, or Firm*—Posz Law Group, PLC

(57) ABSTRACT

An item search device comprises the following: a downtown information acquiring unit that acquires downtown information about downtowns; a search condition setting unit for setting search conditions for search for the downtowns; and a downtown search unit that searches desired downtowns from the downtown information based on the search conditions. With this structure, the user can appropriately and efficiently find a desired downtown.

17 Claims, 10 Drawing Sheets

FIG. 7

DISTANCE BETWEEN PRESENT POSITION AND DOWNTOWN    BACK

| 5km OR LESS |
| 10km OR LESS |
| 20km OR LESS |
| OVER 20km |

SCALE OF DOWNTOWN

☒ LARGE
☒ MEDIUM
☒ SMALL

FIG. 8

BACK

| SCALE | STORES | DIRECTION | DISTANCE |
|---|---|---|---|
| LARGE | 100 | ⇐ | 5km |
| LARGE | 90 | ↗ | 10km |
| MEDIUM | 50 | ⇓ | 20km |
| SMALL | 20 | ↘ | 20km |

| | | |
|---|---|---|
| | | BACK |
| SEARCH DIRECTION | AHEAD ON THE RIGHT ▼ | |
| TIME REQUIRED | 60 | MINUTES OR LESS |
| TOLL | 1000 | YEN OR LESS |
| EASE OF GUIDANCE | APPLIED | NOT APPLIED |
| | PREVIOUS | COMPLETE |

ITEM SEARCH DEVICE

CROSS REFERENCE TO RELATED APPLICATIONS

This application is based on and incorporates herein by reference Japanese Patent Applications No. 2004-245649 filed on Aug. 25, 2004, and No. 2005-170558 filed on Jun. 10, 2005.

FIELD OF THE INVENTION

The present invention relates to an item search device that searches for a user's desired place names or facilities, equipped in, for example, an automobile navigation system that guides a vehicle driver to a destination.

BACKGROUND OF THE INVENTION

A known automobile navigation system functions as follows: when the relevant vehicle is running, it detects the present position by GPS (Global Positioning System) or the like, and displays the present position, together with a road map, on a display device. The system sets appropriate routes from the present position to a destination, and provides routing assistance through the display device or a voice output device. Thus, the automobile navigation systems assist drivers to efficiently drive a car in safety.

In general, the automobile navigation system is not only provided with a basic function of displaying the present position of the relevant vehicle together with the road map of its surrounding area. It is also provided with a function of allowing the user to search for place names or facilities classified by prefectures. In general, this search function is utilized when the user sets a destination, a place on route, or a registered place. More specific description will be given. When the user sets a destination or the like, he/she utilizes the search function to search for a place name or facility, and sets the found place name or facility as the destination or the like. However, this search function has a problem. With this function, the operator can search for his/her desired specific facility, such as a parking lot, but cannot search for areas where a large number of specific facilities are located, for example, districts where parking lots are concentrated.

To cope with this, the navigation system described in Patent Document 1 searches for areas where specific facilities are located based on map information. Further, it displays the degree of concentration of the specific facilities to allow the operator to grasp the degrees of concentration of the specific facilities in the surrounding areas. Thus, when the specific facility is department store, for example, a traffic jam is expected in districts where a plurality of department stores are concentrated. Therefore, the operator can make route search avoiding such districts.

Patent Document 1: JP-2004-109146 A

In the example found in Patent Document 1, specific facilities in the surrounding area are searched for, and the degree of concentration of the specific facilities in the surrounding area is grasped. Therefore, areas, such as downtowns, where a large number of specific facilities are located cannot be searched for.

As mentioned above, the conventional technologies involve a problem: downtowns where various stores are concentrated cannot be searched for. Recently, there have been users' demands for making a little visit to a downtown to look around a lot of stores, or for learning what stores are located in a downtown. However, it is difficult to meet the demands with the conventional technologies.

SUMMARY OF THE INVENTION

It is an object of the present invention to provide an item search device with which the user can appropriately and efficiently search for a desired downtown.

To achieve the above object, the item search device is provided with the following: a downtown information acquiring unit for acquiring downtown information about downtowns; a search condition setting unit for setting conditions for searching for downtowns; and a downtown searching unit for finding a desired downtown from downtown information based on search conditions.

The present invention is so constructed as to provide the user with useful information about downtowns in the following cases: cases where the user does not have a definite destination, such as a specific store or a specific facility, to go; cases where the user desires to hasten to go to a downtown where various stores are concentrated; or cases where the user desires to know what stores or restaurants are located in a downtown. With the above-mentioned configuration, the user can appropriately and efficiently search for a desired downtown.

As another aspect of the present invention, the following configuration can be adopted: downtown information in the item search device is defined as an area where a predetermined number of stores or facilities exist in a predetermined range; the item search device comprises a map data storing unit in which electronic map data is stored; the downtown information is stored in the map data storing unit; and the downtown information acquiring unit acquires downtown information from the map data storing unit. With this configuration, the user can appropriately and efficiently search for a desired downtown.

As another aspect of the present invention, the following configuration can be adopted: the item search device comprises a downtown information setting unit for setting a predetermined range contained in downtown information and a predetermined number of stores or facilities, and a downtown information storing unit for storing preset downtown information; and the downtown information acquiring unit acquires downtown information from the downtown information storing unit. With this configuration, the user can classify the scale of downtowns into, for example, three levels of large, medium, and small for him/herself and set them. When a downtown adjoins a different downtown (for example, downtown A and downtown B adjoin each other within 100 m), the user can set whether to regard them as one downtown.

As another aspect of the present invention, the following configuration can be adopted: downtown information in the item search device includes the scales of downtowns; the search condition setting unit sets a scale of downtown as a search condition; and the downtown searching unit conducts a search using the scale of downtown as a search condition. With this configuration, the user can search only for small-scale downtowns when he/she desires to buy a relatively small quantity of shopping and only for large-scale downtowns when he/she desires to buy a relatively large quantity of shopping.

As another aspect of the present invention, the following configuration can be adopted: downtown information in the item search device includes the durations after establishment of downtowns; the search condition setting unit sets a duration after establishment of downtown as a search condition; and the downtown searching unit conducts a search using the duration after establishment of downtown as a search condition. With this configuration, the user can appropriately and efficiently search for a desired downtown regardless of whether he/she desires to enjoy old appearance or to go to a newly built downtown anyway.

As another aspect of the present invention, the following configuration can be adopted: downtown information in the item search device includes the types of downtowns; the search condition setting unit sets a type of downtown as a search condition; and the downtown searching unit conducts a search using information about the type of downtown as a search condition. The possible types of downtown include amusement facility, commercial district, hot-spring town, and the like. With this configuration, the user can appropriately and efficiently search for a desired downtown.

As another aspect of the present invention, the following configuration can be adopted: downtown information in the item search device includes the degrees of name recognition of downtowns; the search condition setting unit sets a degree of name recognition of downtown as a search condition; and the downtown searching unit conducts a search using information about the degree of name recognition of downtown as a search condition. With this configuration, the user can appropriately and efficiently find a desired downtown when he/she desires to go to a famous downtown.

As another aspect of the present invention, the following configuration can be adopted: the item search device comprises a present position detecting unit that detects the present position of the relevant vehicle, and a distance computing unit that computes the distance between the present position and a downtown; the search condition setting unit sets a computed distance as a search condition; and the downtown searching unit conducts a search using the computed distance as a search condition. With this configuration, the user can search for a downtown with respect to the range of distance from the user; therefore, the user can search for downtowns over a wide range from remote downtowns to nearby downtowns.

As another aspect of the present invention, the following configuration can be adopted: the item search device comprises a traveling direction detecting unit that detects the traveling direction of the relevant vehicle; the search condition setting unit sets a traveling direction of the vehicle as a search condition; and the downtown searching unit conducts a search using the traveling direction of the vehicle as a search condition.

There are cases where the user has not decided to which downtown he/she will go but desires to decide on the direction to go relative to the traveling direction of his/her vehicle. With the above-mentioned configuration, the user can find a desired downtown in a short time.

As another aspect of the present invention, the following configuration can be adopted: the item search device comprises a guided route searching unit that searches for guided routes to a downtown; the search condition setting unit sets a guided route as a search condition; and the downtown searching unit conducts a search using the guided route as a search condition.

Downtowns are various in locational conditions. Guided routes to downtowns are also various. Some guided routes include only arterial roads, and others are guided routes that run through residential areas or include narrow roads. Some guided routes are substantially straight, and other guided routes are winding. Some user or driver may not desire to drive on a narrow road nor take a winding guided route. With the above-mentioned configuration, the user can select a downtown to which he/she can take a desired guided route to go.

As another aspect of the present invention, the following configuration can be adopted: the item search device comprises a toll estimating unit that estimates tolls required to go to downtowns; the search condition setting unit sets a toll as a search condition; and the downtown searching unit conducts a search using the toll as a search condition.

Some users may desire to go to a downtown even when he/she must pay a toll and others may not. With the above-mentioned configuration, the user can elaborately search for a downtown according to his/her demand.

As another aspect of the present invention, the following configuration can be adopted: the item search device comprises an estimated time required computing unit that computes an estimated time required to arrive at a downtown; the search condition setting unit sets an estimated time required as a search condition; and the downtown searching unit conducts a search using the estimated time required as a search condition.

Even when a downtown is located at a short distance, the driver cannot always arrive there in a short time because of road conditions. Some users may desire to arrive at any downtown as early as possible. With the above-mentioned configuration, the user can find a desired downtown in a short time and arrive at a desired downtown in a short time.

As another aspect of the present invention, the following configuration can be adopted: the downtown searching unit of the item search device segments the area within a range of distance, computed from the present position of the relevant vehicle, into mesh areas in predetermined size. It searches the mesh areas for a downtown.

Searching segmented mesh areas for a downtown is more efficient than searching one large area for a downtown. With the above-mentioned configuration, the user can search for a downtown in a short time.

As another aspect of the present invention, the following configuration can be adopted: the downtown searching unit of the item search device searches mesh areas based on the distance between the relevant vehicle and the mesh areas.

With the above-mentioned configuration, the user can efficiently search for a downtown according to the situation. The user can search starting with the mesh area closest to his/her vehicle or search starting with a mesh area far from the vehicle.

As another aspect of the present invention, the following configuration can be adopted: the downtown searching unit of the item search device searches mesh areas based on the traveling direction of the relevant vehicle.

There are cases where the user has not decided which downtown to go but has decided only on the direction in which he/she desires to go. With the above-mentioned configuration, the user searches only mesh areas positioned in the direction in which he/she desires to go, and thus can search for a desired downtown in a short time.

As another aspect of the present invention, the following configuration can be adopted: the item search device comprises a search object setting unit for setting a mesh area as the search object; and the downtown searching unit searches the mesh area set as the search object.

With the above-mentioned configuration, the user can select a mesh area he/she desires to search under conditions other than the distance from the vehicle and the traveling direction of the vehicle, and thus can search for a desired downtown in a short time.

As another aspect of the present invention, the following configuration can be adopted: downtown information in the item search device includes information about the categories of stores or facilities; and the item search device comprises a categorizing unit that categorizes the stores or facilities contained in a found downtown, and a search refining unit that searches for a desired store or facility from among the categorized stores or facilities. With this configuration, after searching for a downtown, the user can examine whether a store or facility classified under his/her desired category (play, eat, stay, etc.) exists in the downtown. Therefore, the user can appropriately and efficiently find a desired downtown and store or facility.

As another aspect of the present invention, the following configuration can be adopted: the item search device comprises a display unit that displays the result of search of downtown or the result of search refinement. With this configuration, the user can view and check information about the found downtown.

As another aspect of the present invention, the following configuration can be adopted: the item search device comprises a routing assistance unit that shows routes to a found downtown or a downtown found by search refinement. With this configuration, the user can arrive at a desired downtown without fail.

BRIEF DESCRIPTION OF THE DRAWINGS

The above and other objects, features, and advantages of the present invention will become more apparent from the following detailed description made with reference to the accompanying drawings. In the drawings:

FIG. 7 is a drawing illustrating an example of a downtown search condition display screen image;

FIG. 8 is a drawing illustrating an example of a downtown search result display screen image;

DETAILED DESCRIPTION OF THE PREFERRED EMBODIMENTS

Hereafter, description will be given to an example in which an item search device according to the present invention is applied to an automobile navigation system with reference to the drawings. The scope of application of the item search device according to the present invention is not limited to automobile navigation system, and it may be constructed as an item search device that carries out the functions according to the present invention, for example, on a personal computer.

Figure 1:
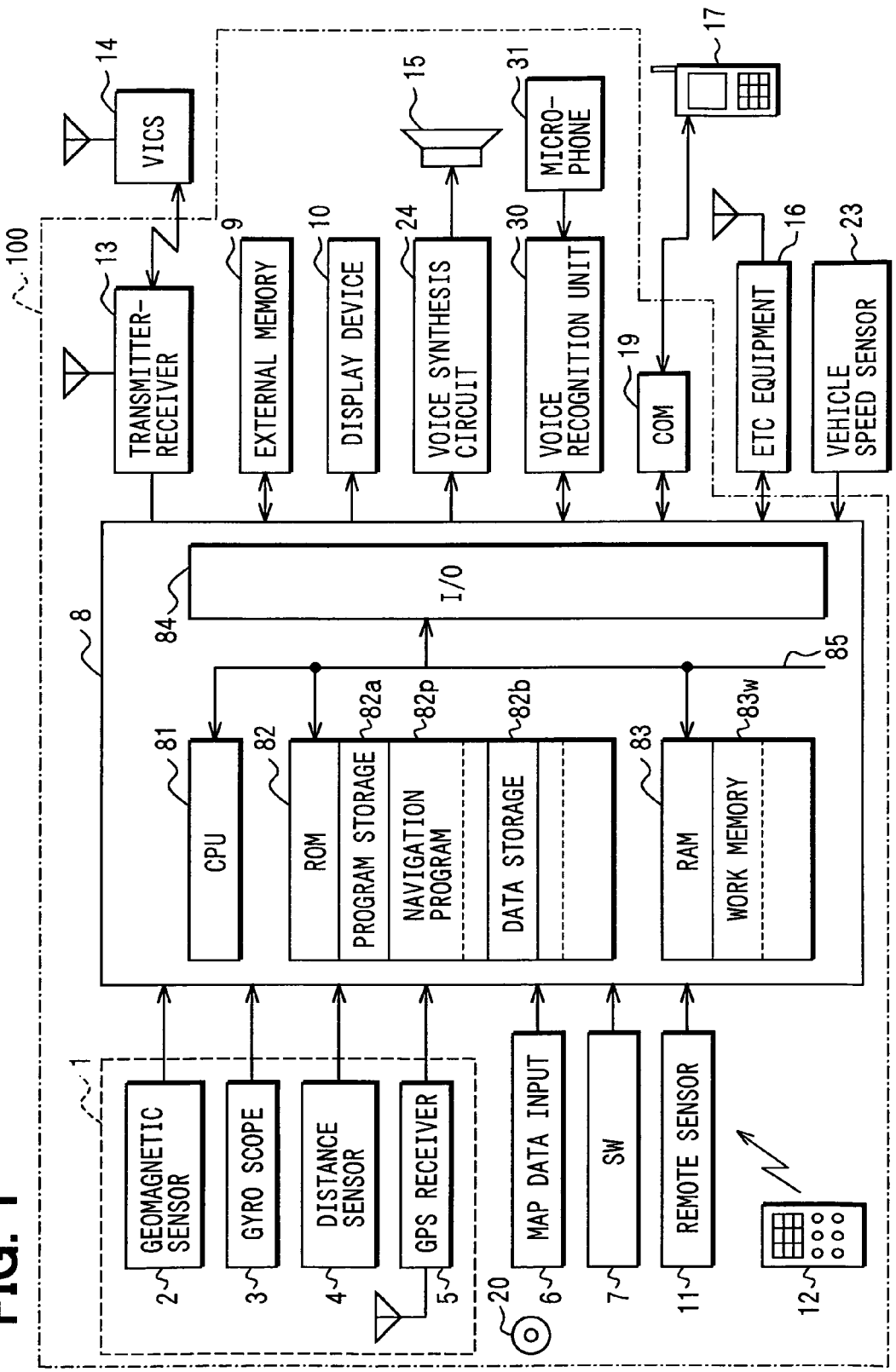
FIG. 1 is a block diagram illustrating the overall configuration of a navigation system according to an embodiment of the present invention.
Figure 2:
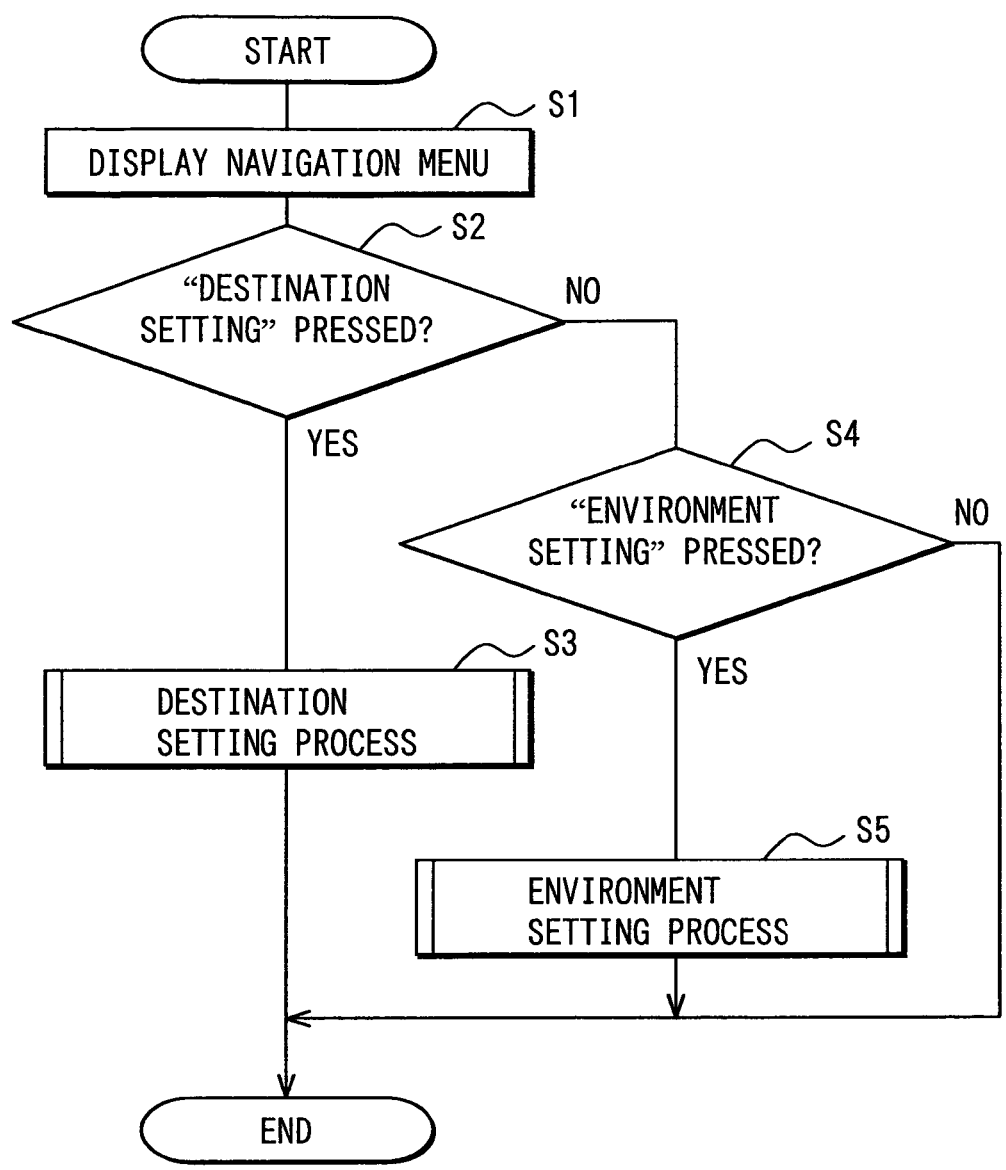
FIG. 2 is a flowchart for explaining each setting process.

FIG. 1 is a block diagram illustrating the overall configuration of a navigation system mounted in a vehicle. The navigation system 100 comprises a position detector 1; a map data input device 6; an operating switch group 7; a remote control (hereafter, referred to as "remote") sensor 11; a speaker 15 for providing audio assist; an external memory 9; a display device 10; a control circuit 8 connected with these items; and a remote terminal 12.

The position detector 1 detects the present position, and includes a geomagnetic sensor 2, a gyro scope 3, a distance sensor 4, and a GPS receiver 5 for GPS that detects the position of a vehicle based on radio waves from satellites. These items are publicly known. These sensors and the like 2, 3, 4, and 5 have errors different in property; therefore, the position detector is so constructed that it uses a plurality of sensors to complement them. The position detector may be constructed of some of the above-mentioned sensors depending on their accuracy. Further, a rotation sensor for steering, wheel sensors for respective rolling wheels, and the like may be used.

The map data input device 6 is a device for inputting varied data, including data for so-called map matching for the enhancement of position detection accuracy, and road data indicating the connections of roads, from storage media 20. In general, CD-ROM, DVD, or hard disk drive (hereafter, referred to as "HDD") is used for storage media because of their capacities for data storage. However, any other media, such as memory card, may be used.

The storage media 20 stores electronic map data and downtown information about downtowns as well. The downtown information includes information about the following: the names, locations, and scales of downtowns, the venerability (or newness) of the stores and facilities constituting downtowns, the categories, degrees of name recognition, targeted age groups (family-oriented, youth-oriented, etc.), opening hours, natural environment (proximity to mountain or sea, etc.), and budgets (fancy or folksy) of the stores and facilities constituting downtowns, and the like.

For the map data, predetermined map image information for display is stored, and further, road network information, including link information and node information, is also stored. The link information is information about predetermined sections constituting each road, and comprises position coordinates, distance, time required, width of road, number of lanes, speed limit, and the like. The node information is information that defines intersections (fork roads) and the like, and comprises position coordinates, number of right-turn and left-turn lanes, links with road connected to, and the like. For the link-to-link connection information, data indicating whether a road is passable or not and the like is set.

The operating switch group 7 is used to make various settings. For the operating switch group 7, for example, touch switches, mechanical switches, or the like integrated with the display device 10 are used. The touch switches are constituted of infrared sensors finely and vertically and horizontally disposed in the screen of the display device 10. When an infrared ray is intercepted by a finger, a touch pen, or the like, the corresponding position is detected as two-dimensional coordinate values (X, Y). In addition, a pointing device, such as a mouse or cursor, may be used. The operating switch group 7 and the remote terminal 12 can be used to input various instructions.

In addition to the operating switch group 7 and the remote terminal 12, a voice recognition unit 30 can be used to input various instructions. In this case, the following operation is performed: when voice is inputted through a microphone 31 connected to the voice recognition unit 30, the resulting aural signal is subjected to voice recognition processing by a publicly known voice recognition technique. Then, it is converted into an operation command corresponding to the result of voice recognition.

The display device 10 is comprised of a color liquid crystal display. The following are displayed on the screen of the display device 10 in a superimposed manner: a mark corresponding to a vehicle present position inputted from the position detector 1; map data inputted from the map data input device 6, and additional data, such as guided routes, displayed over a map. Also, menu buttons are displayed on the screen for making various settings for routing assistance and for changing guidance during routing assistance or screen pages. For the display device, an organic EL (Electro Luminescence) display or a plasma display may be used.

The speaker 15 is connected to a publicly known voice synthesis circuit 24 connected to an I/O 84 of the control circuit 8. It outputs analog voice converted from digital data under voice, stored in the nonvolatile memory 9 or the HDD, to the voice synthesis circuit 24 according to instructions from a navigation program 82$p$. Possible methods for voice synthesis include: recording/editing method in which voice waveforms are accumulated, untouched or encoded, and are spliced as required; parameter editing method in which voice waveforms are analyzed and converted into the form of parameter, and these parameters are accumulated and spliced and the voice synthesis circuit is driven to generate voice; speech synthesis by rule in which voice is generated from character strings or phonemic symbol strings based on phonetic and linguistic rules; and the like.

A vehicle speed sensor 23 includes a rotation detecting portion, such as a publicly known rotary encoder. It is so designed that it is installed, for example, in proximity to a wheel installation portion and it detects the rotation of wheels and sends it to the control circuit 8 as a pulse signal. The control circuit 8 converts the number of wheel rotations into a vehicle speed, and computes an estimated time required to arrive from the present position of the vehicle to a predetermined place. Or, it computes the average vehicle speed with respect to each of the sections in which the vehicle is running. The control circuit 8 can also compute the mileage of the vehicle from the vehicle speed and the driving time.

A transmitter-receiver 13 is a device for carrying out communication with, for example, the VICS (Vehicle Information and Communication System) center 14. Information is received from the outside through the transmitter-receiver 13 and then processed at the control circuit 8.

Connection with external networks, such as the Internet, can also be established by connecting mobile communication equipment, such as a cellular phone 17 or a car telephone, to a communication unit 19. Toll information and the like, received from roadside ETC (Electronic Toll Collection) equipment by in-vehicle ETC equipment 16, can be taken into the navigation system 100 by communicating with the in-vehicle ETC equipment 16. Also, connection with external networks can be established by the in-vehicle ETC equipment 16. Such a configuration that communication with the information center 14 is carried out through the cellular phone 17 or the in-vehicle ETC equipment 16 may be adopted.

The control circuit 8 is constructed as an ordinary computer, and is provided with publicly known CPU 81, ROM 82, RAM 83, I/O 84 as an input/output circuit, and bus lines 85 that connect these components. The CPU 81 carries out control according to programs and data stored in the ROM 82 and the RAM 83. The ROM 82 includes a program storage area 82$a$ and a data storage area 82$b$. The program storage area 82$a$ holds the navigation program 82$p$. The data storage area 82$b$ holds data required for the operation of the navigation program 82$p$. The navigation program 82$p$ runs using work memory 83$w$ for the navigation program on the RAM 83 as a working area. Where HDD is used in the map data input device 6, the functions of the ROM 82 and RAM 83 may be carried out by the HDD.

Where HDD is included in the configuration of the navigation system 100, the navigation program 82$p$ and data required for the operation of the navigation program 82$p$ may be stored on the HDD. In this case, read and write of data from and to the HDD are controlled through the I/O 84.

The external memory 9 is comprised of a rewritable semiconductor memory, such as EEPROM (Electrically Erasable & Programmable Read Only Memory) and flash memory. It holds information and data, including the above-mentioned downtown information, required for the operation of the navigation system 100. The external memory 9 is so constructed that, even when the accessory switch of the vehicle is turned off (that is, the navigation system 100 is turned off), memory contents are maintained. Where HDD is included in the configuration of the navigation system 100, information and data required for the operation of the navigation system 100 may be stored on the HDD, in place of the external memory 9.

With the above-mentioned configuration, the navigation system 100 can automatically set the optimum route by the following procedures: (i) The navigation program 82$p$ is started by the CPU 81 of the control circuit 8. (ii) A menu for selecting the routing assistance process is displayed on the display device 10. (iii) The driver selects the routing assistance process from the menu and correspondingly input a destination based on a map or the like on the display device 10 through the operating switch group 7 or the remote terminal 12 or by voice through the microphone 31. In detail, in this routing assistance process, based on satellite data obtained from the GPS receiver 5, the present position of the vehicle is determined. The optimum route is then determined from the present position to the destination. The screen of the display device 10 shows a mark corresponding to the present position, map data inputted from the storage media 20, and additional data, such as guided routes, over a map in a superimposed manner. In addition, the screen shows menu buttons for making various settings for routing assistance and for changing guidance during routing assistance or screen pages. Publicly known methods for automatically setting the optimum route include the Dijkstra method.

After the optimum guided route is determined, the control circuit 8 sets routing assistance points, such as intersections at which the guided route turns to the left or right and buildings and the like that act as landmarks. Thereafter, it determines guidance providing points. The guidance providing point is a point at a certain distance from a set routing assistance point, and, when the vehicle comes close to this point, guidance is to be provided by voice. A plurality of guidance providing points can be set. When a routing assistance point is an intersection, for example, points 700 m, 300 m, and 100 m before the intersection can be set for open roads and points 2 km, 1 km, and 500 m before the intersection can be set for express highways. When the vehicle arrives at a guidance providing point, a guidance message is given out from the speaker 15. Guidance may be provided by the screen display on the display device 10.

Also, on occasions other than routing assistance, guidance for operation or a message corresponding to the state of operation are displayed or given out through either or both of the display device 10 and the speaker 15

(Downtown Information Setting Process)

Description will be given to the downtown information setting process with reference to FIG. 2, FIG. 3, FIG. 5, FIG. 6, and FIG. 10. This downtown information setting process is included in the navigation program 82*p* and is repeatedly performed together with other processes. As illustrated in the flowchart in FIG. 2, the user causes the navigation menu, illustrated in FIG. 5, to be displayed on the display device 10 by operating the operating switch group 7 or the remote terminal 12 or by voice input through the microphone 31 (S1). With respect to the blank menu buttons in FIG. 5, their button names are omitted because they are not pertinent to this downtown information setting process.

Figure 5:
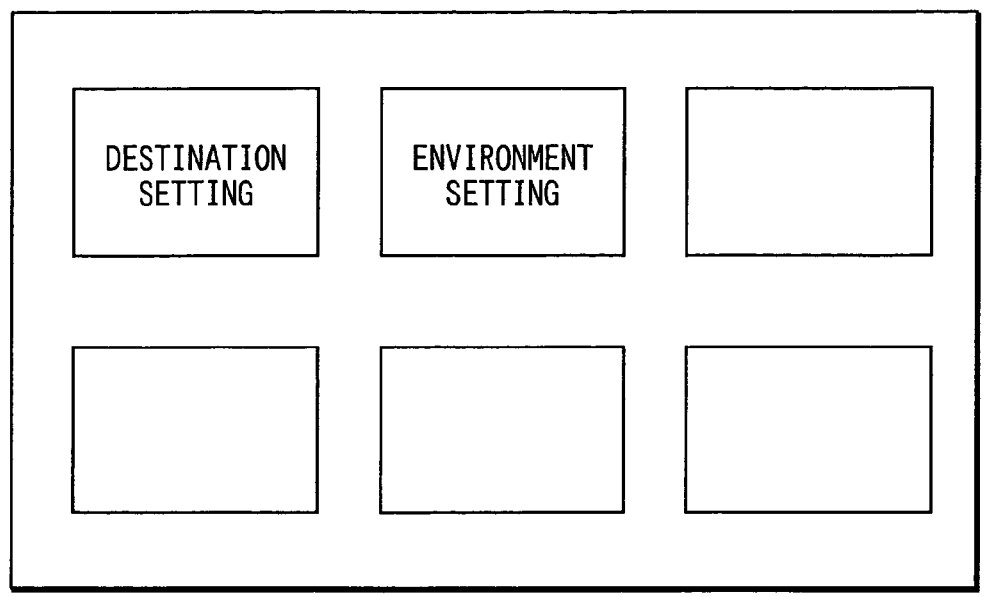
FIG. 5 is a drawing illustrating an example of a navigation menu display screen image.
Figure 6:
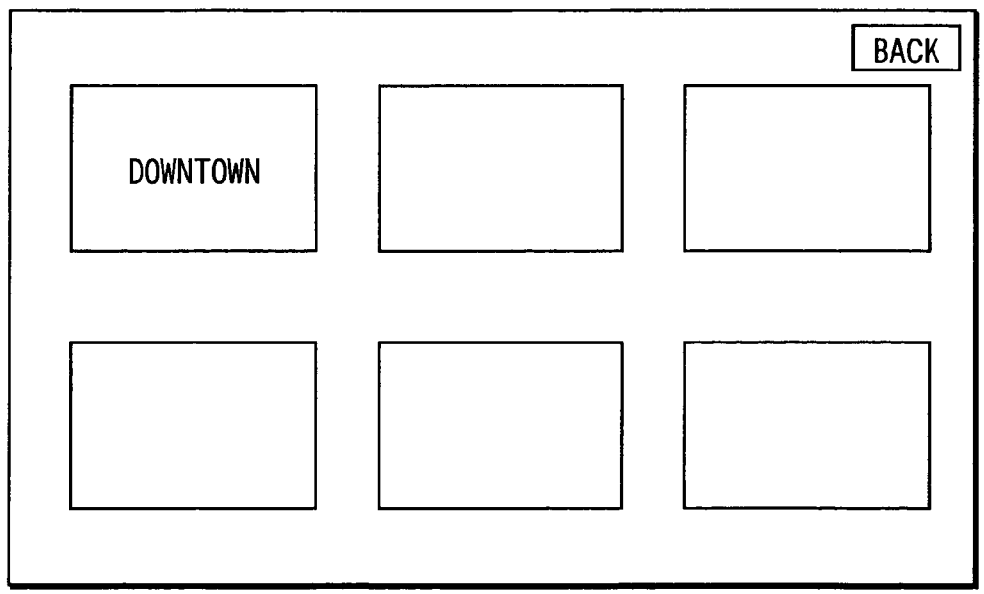
FIG. 6 is a drawing illustrating an example of a display screen image shown in downtown setting or downtown search.

When the "Environment setting" button is pressed in the navigation menu in FIG. 5 (S4: Yes), the environment setting menu illustrated in FIG. 6 is displayed on the display device 10, and the operation proceeds to the environment setting process (S5).

Figure 3:
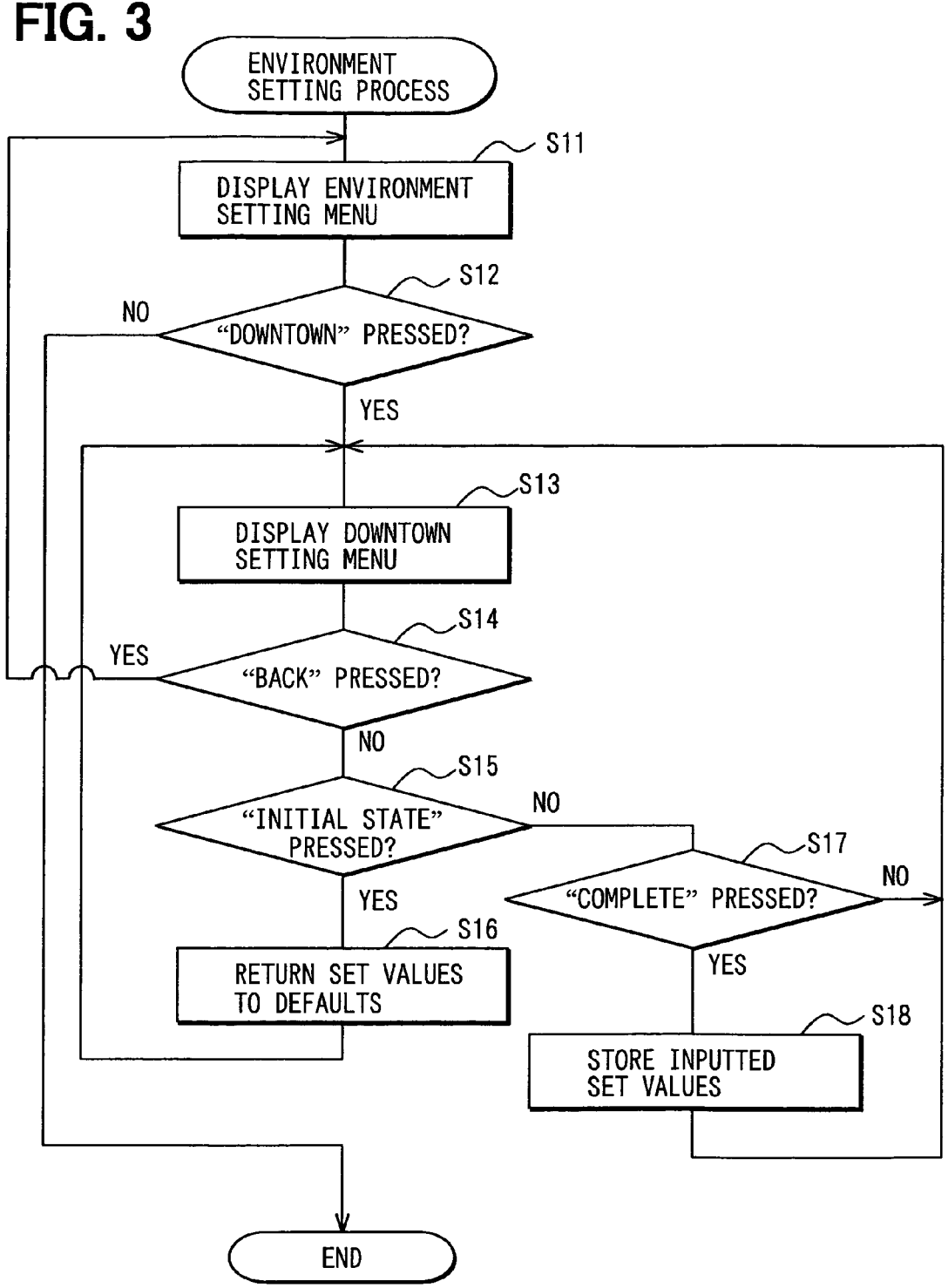
FIG. 3 is a flowchart for explaining a downtown setting process.

Description will be given to the details of the downtown information setting process with reference to the flowchart in FIG. 3. When the environment setting menu illustrated in FIG. 6 is displayed (S11), the "Downtown" button is pressed (S12: Yes) to cause the display screen image of downtown setting menu, illustrated in FIG. 10, to be displayed on the display device 10 (S13). When the "Back" button is pressed with the display screen image of downtown setting menu displayed (S14: Yes), the downtown information setting process is terminated, and the operation goes back to the state in which the environment setting menu in FIG. 6 is displayed (S11).

When the "Initial state" button is pressed with the display screen image of downtown setting menu displayed (S15: Yes), the appropriate values stored in advance in the ROM 82 or the external memory 9 are set for the following items by default: the reference range R for determining the scales of downtowns; the threshold value X1 for the judgment of large-scale downtown; the threshold value X2 for the judgment of medium-scale downtown; the threshold value X3 for the judgment of small-scale downtown; and the threshold value Y for regarding adjoining downtowns as one downtown. These values are stored in a predetermined area in the external memory 9 (S16), and the operation goes back to the display screen image of downtown setting menu illustrated in FIG. 10 (S13).

To input certain values for R, X1, X2, X3, and Y (S15: No), the corresponding place is pressed. Then, the numeric value in the pressed place is displayed in reverse video (or reversing display), and a new numeric value can be inputted. Thereafter, a desired numeric value is inputted. When the value inputted at this time does not meet the relation expressed as X1>X2>X3, a message may be displayed on the screen or a voice message may be given out from the speaker 15 to notify the operator that the inputted value is invalid and the operator may be prompted to input a value again.

Figure 10:
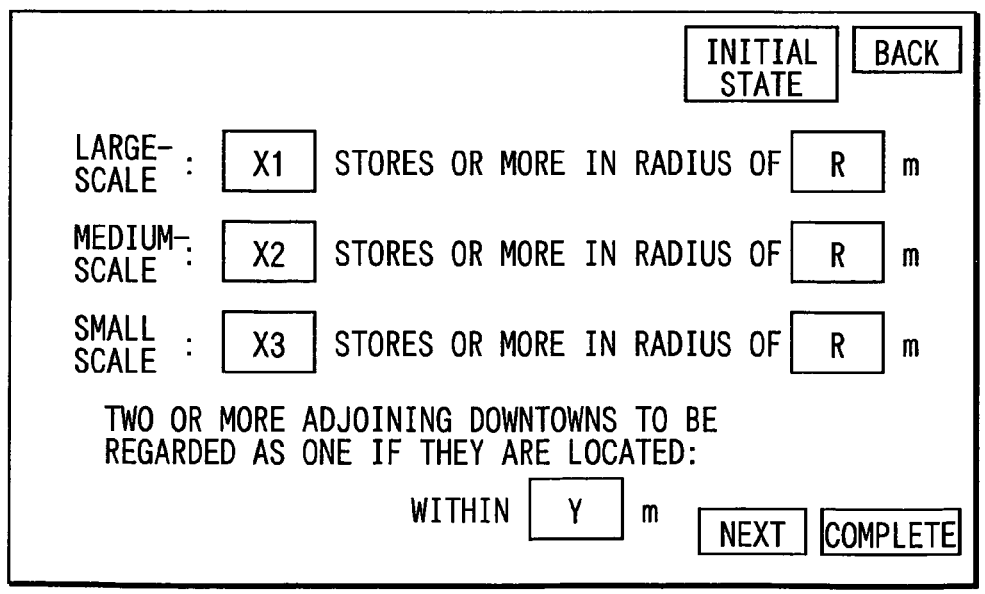
FIG. 10 is a drawing illustrating an example of a display screen image for downtown setting process.

The scale of a downtown is determined based on how many commercial facilities or amusement facilities are located in a predetermined range (the area with in R-m radius in the example of FIG. 10).

When arbitrary values are inputted for R, X1, X2, X3, and Y and the "Complete" button is pressed (S17: Yes), the inputted values are stored in a predetermined area in the external memory 9 (S18), and the operation goes back to the display screen image of downtown setting menu illustrated in FIG. 10 (S13).

Figures 12, 13:
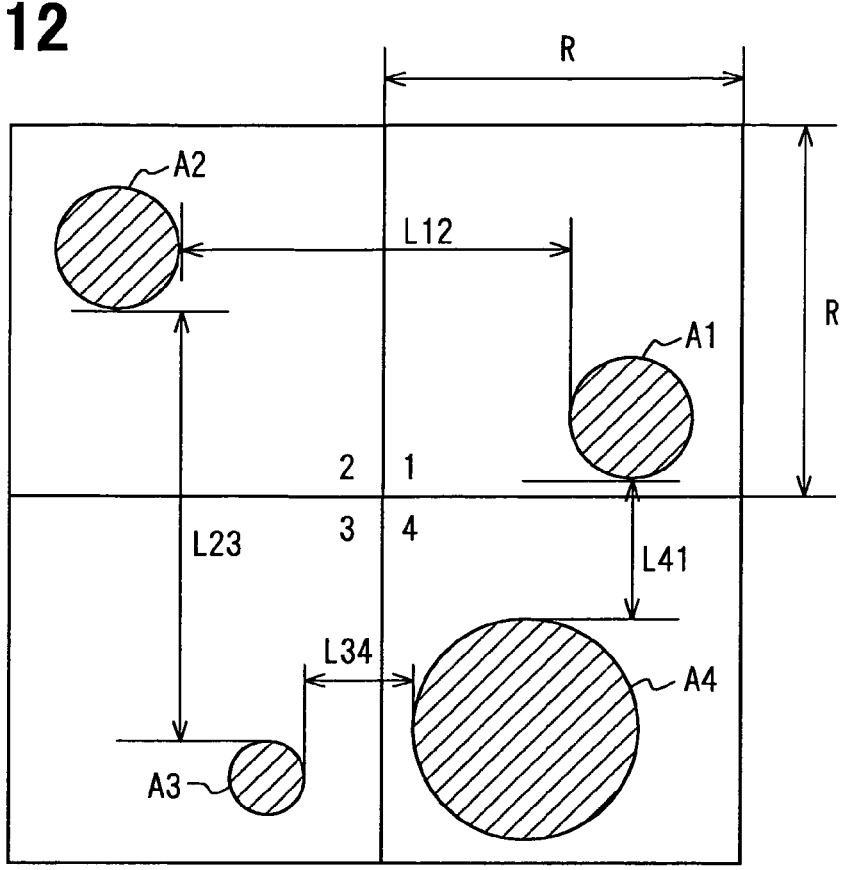
FIG. 12 is a drawing illustrating the details of the downtown search method, subsequent to FIG. 11.
FIG. 13 is a drawing illustrating an example of the display screen image for downtown setting process, subsequent to FIG. 10.

In the above-mentioned screen page for downtown information setting, the relation with the traveling direction of the vehicle may be included in the setting items. The screen of the display device 10 shows a screen page for setting whether to use the positional relation with the traveling direction of the vehicle. The positional relations with the traveling direction of the vehicle include ahead, ahead on the left, ahead on the right, left, right, rearward, rearward on the left, and rearward on the right relative to the traveling direction of the vehicle. As illustrated in FIG. 13, one direction can be set from a pull-down menu. Such a configuration that two or more directions can be combined to make a setting may be adopted. When "Ahead on the right" is set in the example in FIG. 13, downtowns are searched for in the range between the lines at 22.5 degrees on the left and right to the center line at 45 degrees on the right to the traveling direction of the vehicle. In addition, a direction may be specified by clockwise angle from the traveling direction of the vehicle at 0 degree. For example, "Ahead on the left" is equivalent to "315 degrees." The traveling direction of the vehicle can be determined by storing the present position of the vehicle in the RAM 83 or the like with a predetermined timing, and examining the progression of the present position. When it is not desired that traveling direction is included in conditions, an option of, for example, "All directions" can be included in the pull-down menu.

In the above-mentioned screen page for downtown information setting, the time required for the vehicle to arrive at the downtown may be included in the setting items. The screen of the display device 10 shows a screen page for setting the time required for the vehicle to arrive at the downtown. When "60 minutes or less" is set as illustrated in FIG. 13, for example, guided routes between the found downtowns and the present position of the vehicle are searched for. The length of each of the guided routes is measured, and the estimated time required to arrive at the downtown is determined using the average speed of the vehicle. Only downtowns whose estimated time required is 60 minutes or less are displayed as the search result. The average speed of a vehicle can be determined from, for example, the vehicle's mileage for a predetermined time. Or, uniformly established values, for example, 40 km/h for open road and 80 km/h for toll road, may be used. Or, an estimated time required may be determined using traffic information acquired form the VICS center 14. When it is not desired that time required is included in conditions, for example, "999 minutes" can be inputted.

In the above-mentioned screen page for downtown information setting, a toll required for the vehicle to arrive at the downtown may be included in the setting items. The screen of the display device 10 shows a screen page for setting a toll required for the vehicle to arrive at the downtown. When "1000 yen or less" is set as illustrated in FIG. 13, for example, guided routes between the found downtowns and the present position of the vehicle are searched for. Only downtowns at which a toll of 1000 yen or less will be required to drive along the guided route to arrive are displayed as the search result. When it is not desired that toll is included in conditions, for example, "99999 yen" can be inputted.

In the above-mentioned screen page for downtown information setting, whether the vehicle can be easily guided to a downtown may be included in the setting items. The screen of the display device 10 shows a screen page for setting whether to use ease of guidance. Possible parameters for ease of guidance include "the number of left or right turns is low," "the downtown is located on an arterial road," "the downtown is easy to get into/out," and the like. These pieces of information are stored in advance in the external memory 9 or the like.

The user may add any parameter. When "Applied" is set for ease of guidance, as illustrated in FIG. 13, the guided routes between the found downtown and the present position of the vehicle are searched for. Only downtowns the guided routes to which satisfy the above-mentioned parameters are displayed as the search result.

The settings of traveling direction, time required, toll, and ease of guidance mentioned above are displayed on the same screen page as the screen page for setting illustrated in FIG. 10 or on a separate screen page. When they are displayed on a separate screen page, for example, the following configuration is adopted: the "Next page" button is displayed at the lower right of the screen page for setting in FIG. 10. When the "Next page" button is pressed, the screen page proceeds to the screen page for setting traveling direction, time required, toll, and ease of guidance, illustrated in FIG. 13.

(Downtown Search Process)

Description will be given to the downtown search process with reference to FIG. 2, FIG. 4, and FIG. 5 to FIG. 8. This downtown search process is included in the navigation program 82p and is repeatedly performed together with other processes. As illustrated in the flowchart in FIG. 2, the driver causes the navigation menu, illustrated in FIG. 5, to be displayed on the display device 10 by operating the operating switch group 7 or the remote terminal 12 or by voice input through the microphone 31 (S1).

When the "Destination setting" button is pressed in the navigation menu in FIG. 5 (S2: Yes), the destination setting menu illustrated in FIG. 6 is displayed on the display device 10, and the operation proceeds to the destination setting process (S3). With respect to the blank menu buttons in FIG. 6, their button names are omitted because they are not pertinent to this downtown search process.

Figure 4:
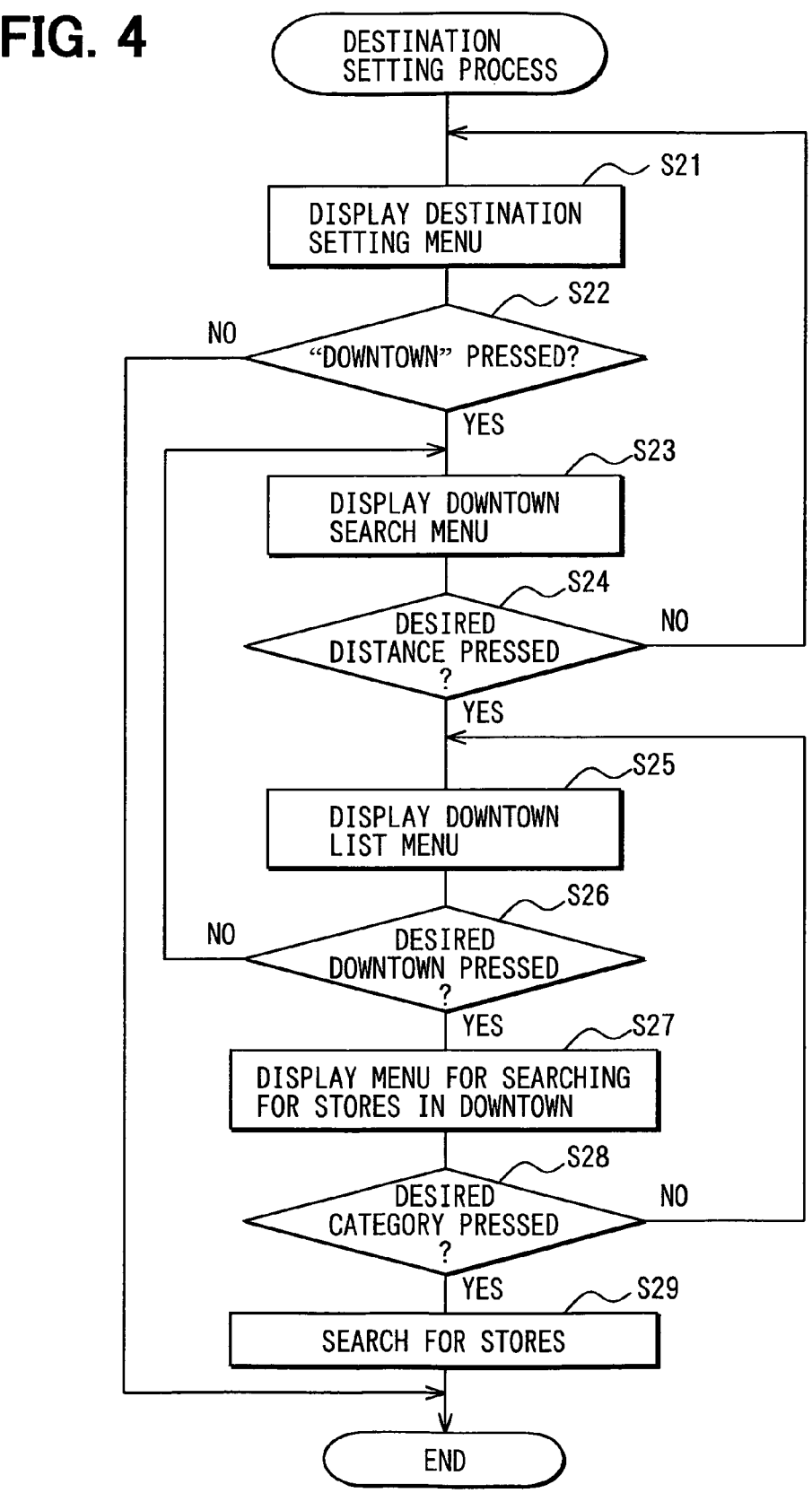
FIG. 4 is a flowchart for explaining a downtown search process.

Description will be given to the details of the downtown search process with reference to the flowchart in FIG. 4. When the destination setting menu illustrated in FIG. 6 is displayed (S21), the "Downtown" button is pressed (S22: Yes) to cause the screen page for downtown search condition setting, illustrated in FIG. 7, to be displayed on the display device 10 (S23). When the "Back" button is pressed with the screen page for downtown search condition setting displayed, the downtown search process is terminated, and the operation goes back to the state in which the destination setting menu in FIG. 6 is displayed.

In the example illustrated in FIG. 7, the downtown's distance from the present position of the vehicle and the scale of downtown are used for downtown search conditions. The setting in this example is as follows: the downtown's distance from the present position of the vehicle is 20 km or less and no limitation is imposed on the scale of downtown. Instead of the distance from the present position of the vehicle, the distance from a reference point, such as the home of the user's own and a predetermined facility, specified by the user may be used for a downtown search condition.

When downtown search conditions are inputted (S24: Yes), downtowns are searched for according to the conditions, and the result of search is displayed on the display device (S25). FIG. 8 illustrates an example of the result of search conducted according to the search conditions illustrated in FIG. 7. The screen shows the scales of downtowns, the numbers of stores, and the directions and distances from the present position of the vehicle. With respect to famous downtowns, such as Ginza, the names of downtowns may be displayed together.

Description will be given to an example of a downtown search method with reference to FIG. 11. In the example in FIG. 7, conditions are so set that downtowns located within 20 km from the present position P of the vehicle are searched for.

Figure 11:
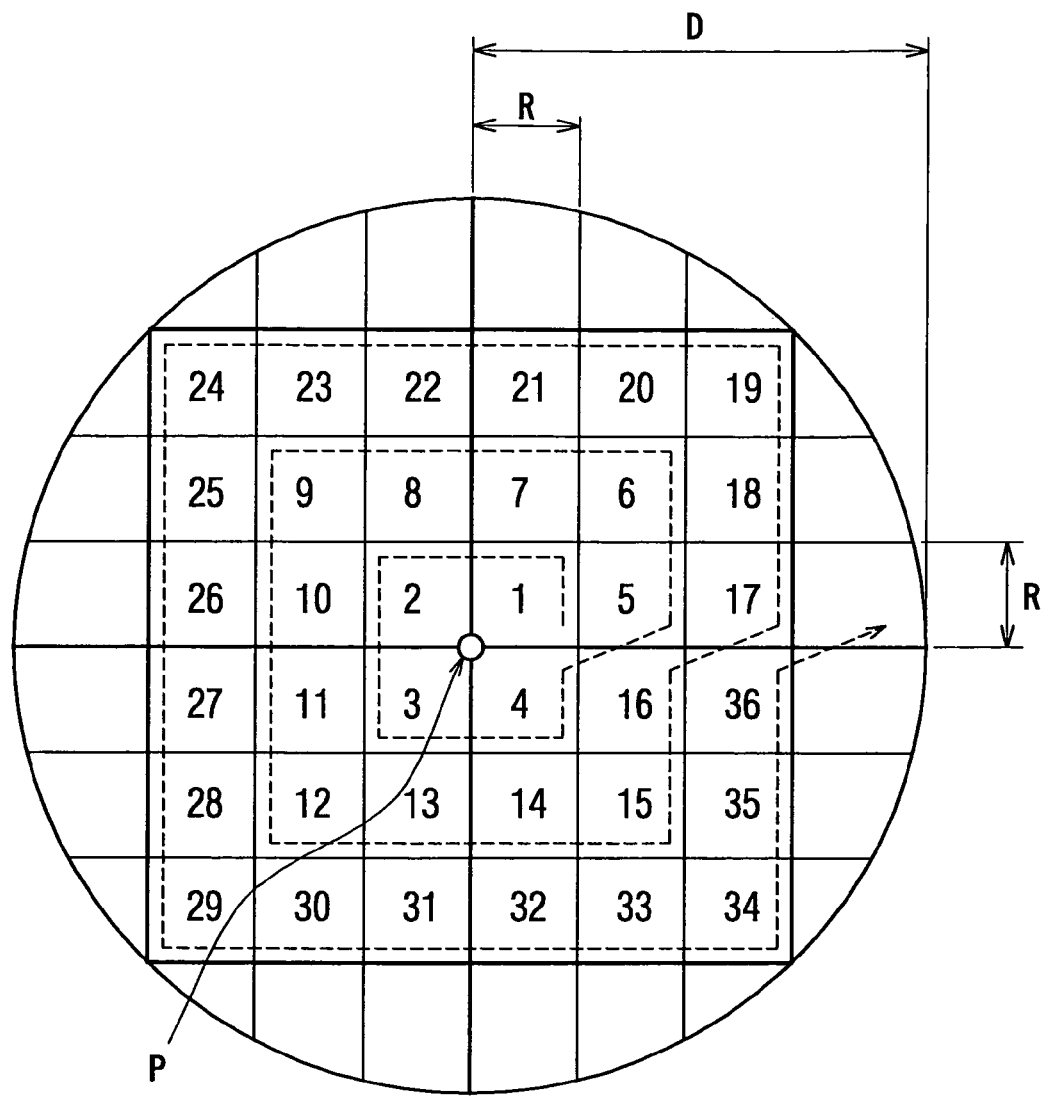
FIG. 11 is a drawing illustrating an example of a downtown search method.

As illustrated in FIG. 11, therefore, the circular area with a radius of D (20 km) with the present position P of the vehicle at the center is searched for downtowns. In the example in FIG. 11, a square inscribed in the circle with a radius of D is defined, and the square is segmented into square meshes with sides R m long. How many stores or facilities are located within the range of each mesh area is examined in increasing order of the distance from the present position P of the vehicle. Then, the downtown information stored in the external memory 9 to determine the scale of each downtown. (Refer to FIG. 10 for downtown information.) When it is determined that a downtown is located in a mesh area, the center of the mesh may be taken as the center of the downtown.

A square circumscribing the circle with a radius of D may be taken as an area to be searched for downtowns, or mesh areas including part, even when it is small, of the circle with a radius of D may be searched. The shape of mesh areas may be polygon or circle, not square.

In the example in FIG. 11, the mesh areas are counterclockwise searched in the order of mesh area 1 closest to the present position P of the vehicle, mesh area 2, mesh area 3, ..., and mesh area 36. The downtown information stored in the external memory 9 is referred to with respect to each of the mesh areas to determine the scale of each downtown. (Refer to FIG. 10 for downtown information.) When adjoining mesh areas are judged to be downtowns, the shortest distance between the stores and facilities contained in the respective mesh areas is measured. When the shortest distance exceeds Y m, the mesh areas are regarded as separate downtowns; when the shortest distance falls below Y m, they are regarded as one and the same downtown. When they are regarded as one and the same downtown, the scale of the downtown is determined again.

Description will be given to the details of downtown search with reference to FIG. 12. Mesh area 1 is searched, and as a result, it is determined that mesh area 1 contains a medium-scale downtown A1. Information indicating that mesh area 1 contains downtown A1 is stored in the external memory 9 or the RAM 83. (This is the same with the following.) Next, mesh area 2 is searched, and as result, it is determined that mesh area 2 contains a medium-scale downtown A2. The distance L12 between the store in downtown A2 closest to mesh area 1 and the store in downtown A1 closest to mesh area 2 is computed. The distance L12 is longer than Y m set in the screen page illustrated in FIG. 10; therefore, downtown A2 and downtown A1 are regarded as separate downtowns.

Next, mesh area 3 is searched, and as a result, it is determined that mesh area 3 contains a small-scale downtown A3. Similarly, the distance L23 between the store in downtown A3 closest to mesh area 2 and the store in downtown A2 closest to mesh area 3 is computed. The distance L23 is longer than Y m set in the screen page illustrated in FIG. 10; therefore, downtown A3 and downtown A2 are regarded as separate downtowns.

Here, the following procedure may be taken: the distance between the store in downtown A3 closest to mesh area 1 and the store in downtown A1 closest to mesh area 3 is computed, and it is examined whether they can be regarded as one and the same downtown.

Next, mesh area 4 is searched, and as a result, it is determined that mesh area 4 contains a large-scale downtown A4. Similarly, the distance L34 between the store in downtown A4 closest to mesh area 3 and the store in downtown A3 closest to mesh area 4 is computed. The distance L34 is shorter than Y m set in the screen page illustrated in FIG. 10; therefore, downtown A4 and downtown A3 are regarded as one and the same downtown, and the combination of downtown A4 and downtown A3 is taken as downtown A4. Information indicating that mesh area 3 and mesh area 4 contain downtown A4 is stored in the external memory 9 or the RAM 83.

Further, the distance L41 between the store in downtown A4 closest to mesh area 1 and the store in downtown A1 closest to mesh area 4 is computed. The distance L41 is longer than Y m set in the screen page illustrated in FIG. 10; therefore, downtown A4 and downtown A1 are regarded as separate downtowns.

Here, the following procedure may be taken: the distance between the store in downtown A4 closest to mesh area 2 and the store in downtown A2 closest to mesh area 4 is computed, and it is examined whether they can be regarded as one and the same downtown.

In the example in FIG. 11, the mesh areas are counterclockwise searched starting with mesh area 1 closest to the present position P of the vehicle to examine and determine the scales of downtowns. Instead, the mesh areas may be clockwise searched, needless to add. Or, the scales of downtowns may be examined starting with the mesh area farthest from the present position P of the vehicle, mesh area 34 in this case.

In the example in FIG. 11, the scales of downtowns may be examined starting with a mesh area located in the driving direction of the vehicle. That is, the scales of downtowns are examined with respect to mesh areas located in the driving direction of the vehicle in the order of mesh area 1, mesh area 2, mesh area 5, ..., mesh area 10, mesh area 17, ..., and mesh area 26. Then, the scales of downtowns are similarly examined with respect to mesh areas located on the opposite side to the driving direction of the vehicle. The driving direction of the vehicle can be determined from the progression of the present position P of the vehicle.

In the example in FIG. 11, such a configuration that the user can set areas to be checked for the scale of downtown may be adopted. This setting is made by taking the following procedure: the present position P of the vehicle and a circle with a radius of D with the present position at the center are displayed on the screen of the display device 10; and areas to be checked for the scale-of downtown are specified by operating the operating switch group 7 or the remote terminal 12 or by voice input through the microphone 31. Setting can be made on a mesh area-by-mesh area basis.

The above-mentioned downtown search may be terminated when the distances between the present position P of the vehicle and downtowns are determined and a predetermine number of downtowns are found in increasing order of the distance from the present position P of the vehicle. In the example illustrated in FIG. 8, the predetermined number of downtowns is four. Like this, a number of downtowns that will fit into one page of display screen image may be adopted. This makes it possible to save the user from having to scroll the display screen image.

Figure 14:
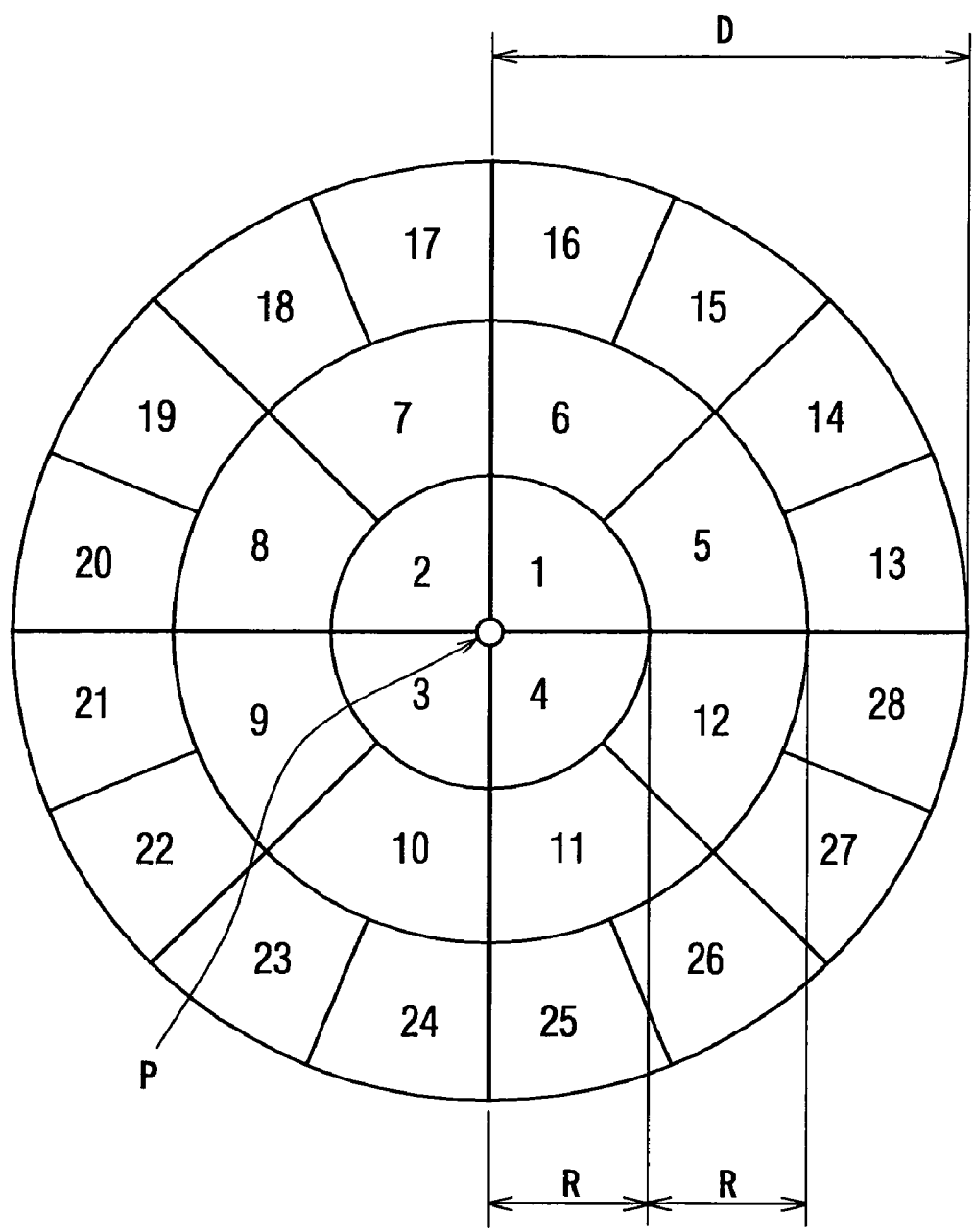
FIG. 14 is a drawing illustrating another example of a downtown search method.

The search method illustrated in FIG. 14 may be adopted. That is, concentric circles are so formed that their center agrees with the present position P of the vehicle and the distances between their circumferences are equally R. The areas sandwiched between the adjoining concentric circles are divided into mesh areas, and these mesh areas are counterclockwise searched, for example, in increasing order of the distance from the present position P of the vehicle. That is, downtowns may be searched for in the order of numbers in FIG. 14. The radius of the outermost concentric circle becomes equal to D or close to D. Polygons whose center agrees with the present position P of the vehicle may be used in place of concentric circles.

In the above-mentioned downtown search method, the search range is set with the present position of the vehicle taken as the reference point. Instead, a point or facility other than the present position of the vehicle may be taken as the reference point. In this case, the screen page for downtown setting process, illustrated in FIG. 10, shows an item for setting the reference point, and, for example, options "Present position of vehicle" and "Specified point" are displayed as options. Where "Present position of vehicle" is selected, the present position of the vehicle detected by the position detector 1 is set as the reference point. Where "Specified point" is selected, a point or facility is searched for by the same method as for searching for an ordinary destination in the navigation system, and it is set as the reference point. The setting is stored in the external memory 9. When a reference point is set, past settings may be displayed and a reference point may be set from among them.

Together with the above-mentioned search method, a method in which downtown information stored in the storage media 20 is searched based on preset downtown search conditions may be used. Either or both of these two search methods are used. When these two methods are used for searching and as a result, the positions of downtowns overlap, the result of searching the downtown information stored in the storage media 20 is displayed. The search methods and the display of search result are so designed that they can be set by the user. The user causes the environment setting menu as illustrated in FIG. 6 to be displayed on the display device 10 by operating the operating switch group 7 or the remote terminal 12 or by voice input through the micro phone 31. The user then presses search setting buttons (not shown) to set desired items. The result of setting is stored in a predetermined area in the external memory 9.

In addition to the foregoing, the following items may be used for downtown search conditions: the venerability (or newness), the degrees of name recognition, targeted age groups (family-oriented, youth-oriented, etc.), opening hours, natural environment (proximity to mountain or sea, etc.), and budgets of the stores and facilities constituting downtowns, and the like. Needless to add, any one item or a combination of two or more items is used for downtown search conditions. These data required for search is stored in the external memory 9 or the storage media 20.

Figure 9:
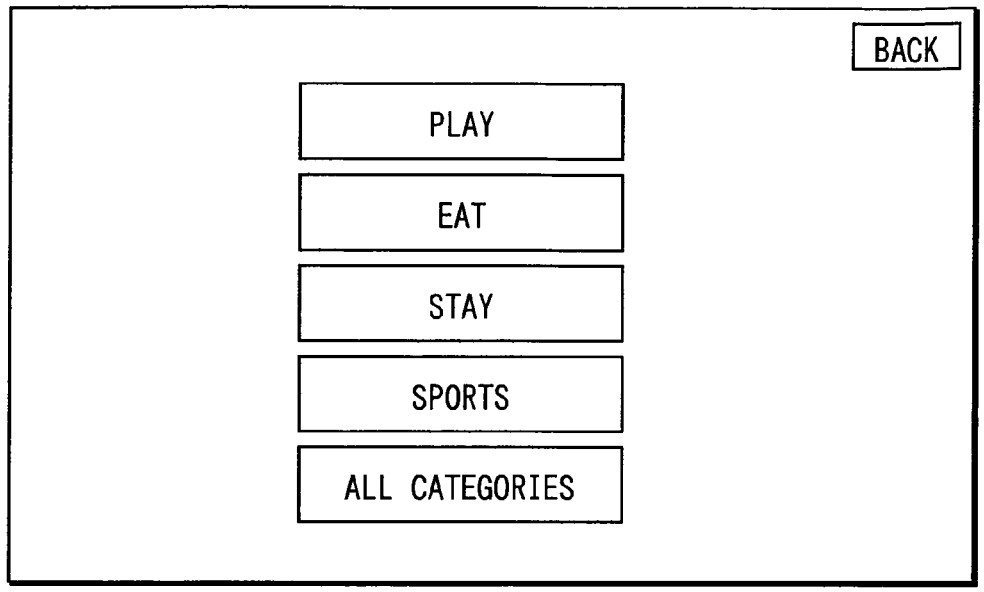
FIG. 9 is a drawing illustrating an example of a category select display screen image.

When a desired downtown is selected from a downtown list illustrated in FIG. 8 (the line on which a desired downtown is indicated is pressed on the display screen image) (S26: Yes), the screen page for category selection as illustrated in FIG. 9 is displayed (S27). When the button for a desired category is pressed (S28: Yes), stores and facilities under the desired category located in the selected downtown are displayed. When a desired one is selected from among the displayed stores and facilities, guided routes to that store or facility are searched for, and routing assistance is provided based on the guided routes.

When the "All categories" button is pressed on the screen display image illustrated in FIG. 9, a guided route to the center of the selected downtown or the facility that is a feature of the selected downtown is searched, and routing assistance is provided based on the guided route.

It will be obvious to those skilled in the art that various changes may be made in the above-described embodiments of the present invention. However, the scope of the present invention should be determined by the following claims.

What is claimed is:

1. An item search device comprising:
   a downtown information acquiring unit that acquires downtown information about downtowns;
   a search condition setting unit that sets search conditions for the downtowns;

a downtown search unit that searches for desired downtowns from the downtown information based on the search conditions;
a downtown information setting unit that sets a predetermined range contained in the downtown information and a predetermined number of stores or facilities; and
a downtown information storing unit that stores the downtown information regarding which the downtown information setting unit sets,
wherein the downtown information acquiring unit acquires the downtown information from the downtown information storing unit.

2. An item search device comprising:
a downtown information acquiring unit that acquires downtown information about downtowns;
a search condition setting unit that sets search conditions for the downtowns; and
a downtown search unit that searches for desired downtowns from the downtown information based on the search conditions,
wherein the downtown information contains scales of the downtowns,
wherein the search condition setting unit sets a scale of a downtown as the search condition, and
wherein the downtown search unit conducts a search using the scale of a downtown as the search condition.

3. An item search device comprising:
a downtown information acquiring unit that acquires downtown information about downtowns;
a search condition setting unit that sets search conditions for the downtowns; and
a downtown search unit that searches for desired downtowns from the downtown information based on the search conditions,
wherein the downtown information contains durations after establishment of the downtowns,
wherein the search condition setting unit sets a duration after establishment of a downtown as the search condition, and
wherein the downtown search unit conducts a search using the duration after establishment of a downtown as the search condition.

4. An item search device comprising:
a downtown information acquiring unit that acquires downtown information about downtowns;
a search condition setting unit that sets search conditions for the downtowns; and
a downtown search unit that searches for desired downtowns from the downtown information based on the search conditions,
wherein the downtown information contains types of the downtowns,
wherein the search condition setting unit sets a type of a downtown as the search condition, and
wherein the downtown search unit conducts a search using information about the type of a downtown as the search condition.

5. An item search device comprising:
a downtown information acquiring unit that acquires downtown information about downtowns;
a search condition setting unit that sets search conditions for the downtowns; and
a downtown search unit that searches for desired downtowns from the downtown information based on the search conditions,
wherein the downtown information contains degrees of name recognition of the downtowns,
wherein the search condition setting unit sets a degree of name recognition of a downtown as the search condition, and
wherein the downtown search unit conducts a search using information about the degree of name recognition of a downtown as the search condition.

6. An item search device comprising:
a downtown information acquiring unit that acquires downtown information about downtowns;
a search condition setting unit that sets search conditions for the downtowns;
a downtown search unit that searches for desired downtowns from the downtown information based on the search conditions;
a present position detecting unit that detects a present position of a vehicle; and
a distance computation unit that computes a distance between the present position of the vehicle and a downtown,
wherein the search condition setting unit sets the computed distance as the search condition, and
wherein the downtown search unit conducts a search using the computed distance as the search condition.

7. The item search device according to claim 6, further comprising:
a traveling direction detecting unit that detects a traveling direction of the vehicle,
wherein the search condition setting unit sets a traveling direction of the vehicle as the search condition, and
wherein the downtown search unit conducts a search using the traveling direction of the vehicle as the search condition.

8. The item search device according to claim 6, further comprising:
a guided route search unit that searches for guided routes to a downtown,
wherein the search condition setting unit sets a guided route as the search condition, and
wherein the downtown search unit conducts a search using the guided route as the search condition.

9. The item search device according to claim 6, further comprising:
a toll estimating unit that estimates a toll required to arrive at a downtown,
wherein the search condition setting unit sets a toll as the search condition, and
wherein the downtown search unit conducts a search using the toll as the search condition.

10. The item search device according to claim 6, further comprising:
an estimated time required computing unit that computes an estimated time required to arrive at a downtown,
wherein the search condition setting unit sets an estimated time required as the search condition, and
wherein the downtown search unit conducts a search using the estimated time required as the search condition.

11. The item search device according to claim 6,
wherein the downtown search unit segments an area within a range of the distance computed from the present position of the vehicle into mesh areas in a predetermined size, and searches the mesh areas for a downtown.

12. The item search device according to claim 11,
wherein the downtown search unit searches the mesh areas based on distances between the vehicle and the mesh areas.

13. The item search device according to claim 11, wherein the downtown search unit searches the mesh areas based on a traveling direction of the vehicle.

14. The item search device according to claim 11, further comprising:
a search object setting unit that sets a mesh area as a search object,
wherein the downtown search unit searches the mesh area set as the search object.

15. An item search device comprising:
a downtown information acquiring unit that acquires downtown information about downtowns;
a search condition setting unit that sets search conditions for the downtowns; and
a downtown search unit that searches for desired downtowns from the downtown information based on the search conditions,
wherein the downtown information contains information about categories of stores or facilities, the item search device further comprising:
a categorizing unit that categorizes the stores or facilities located in a downtown that is searched for; and
a search refinement unit that searches for a desired store or facility from the categorized stores or facilities by search refinement.

16. The item search device according to claim 15, further comprising:
a displaying unit that displays a result of searching for a downtown or a result of the search refinement.

17. The item search device according to claim 15, further comprising:
a routing assistance unit that shows routes to a downtown that is searched for or a downtown that is searched for by search refinement.

* * * * *